United States Patent [19]

Baker

[11] 3,909,518

[45] Sept. 30, 1975

[54] SIGNAL SWITCHING APPARATUS FOR COMPENSATING RECORD DEFECTS

[75] Inventor: Alfred Lynn Baker, Indianapolis, Ind.

[73] Assignee: RCA Corporation, New York, N.Y.

[22] Filed: June 6, 1974

[21] Appl. No.: 477,103

[52] U.S. Cl. .............. 178/6.6 R; 178/6.7 A; 360/38

[51] Int. Cl.$^2$ .............................. H04N 5/76

[58] Field of Search .......... 178/6.6 A, 6.6 R, 6.7 A; 179/100.41 L, 100.3 V, 100.4 R, 100.4 M, 100.3 G, 100.1 B; 325/41, 42; 360/30, 33, 37, 38

[56] References Cited

OTHER PUBLICATIONS

Bussche et al., Philips Tech. Rev., Vol. 33, No. 7, 10/73, pp. 181–185.

Broadbent, Journal of the SMPTE, Vol. 83, No. 7, 7/74 (presented 4/26/74 at society conference, pp. 554–559.

*Primary Examiner*—Raymond F. Cardillo, Jr.

*Attorney, Agent, or Firm*—Eugene M. Whitacre; William H. Meagher

[57] ABSTRACT

In a defect compensation system for a video disc player, stretched versions of defect indication pulses are obtained in a switching control signal generator employing an envelope detector, and a comparator referencing the detector output against a selected threshold voltage. A pair of complementary outputs developed by the comparator are applied to the bases of a pair of serially disposed transistors in respective normal and substitution signal channels, driving one to cutoff and the other to inverted mode saturation, or vice versa.

6 Claims, 2 Drawing Figures

SIGNAL SWITCHING APPARATUS FOR COMPENSATING RECORD DEFECTS

Figure 1:
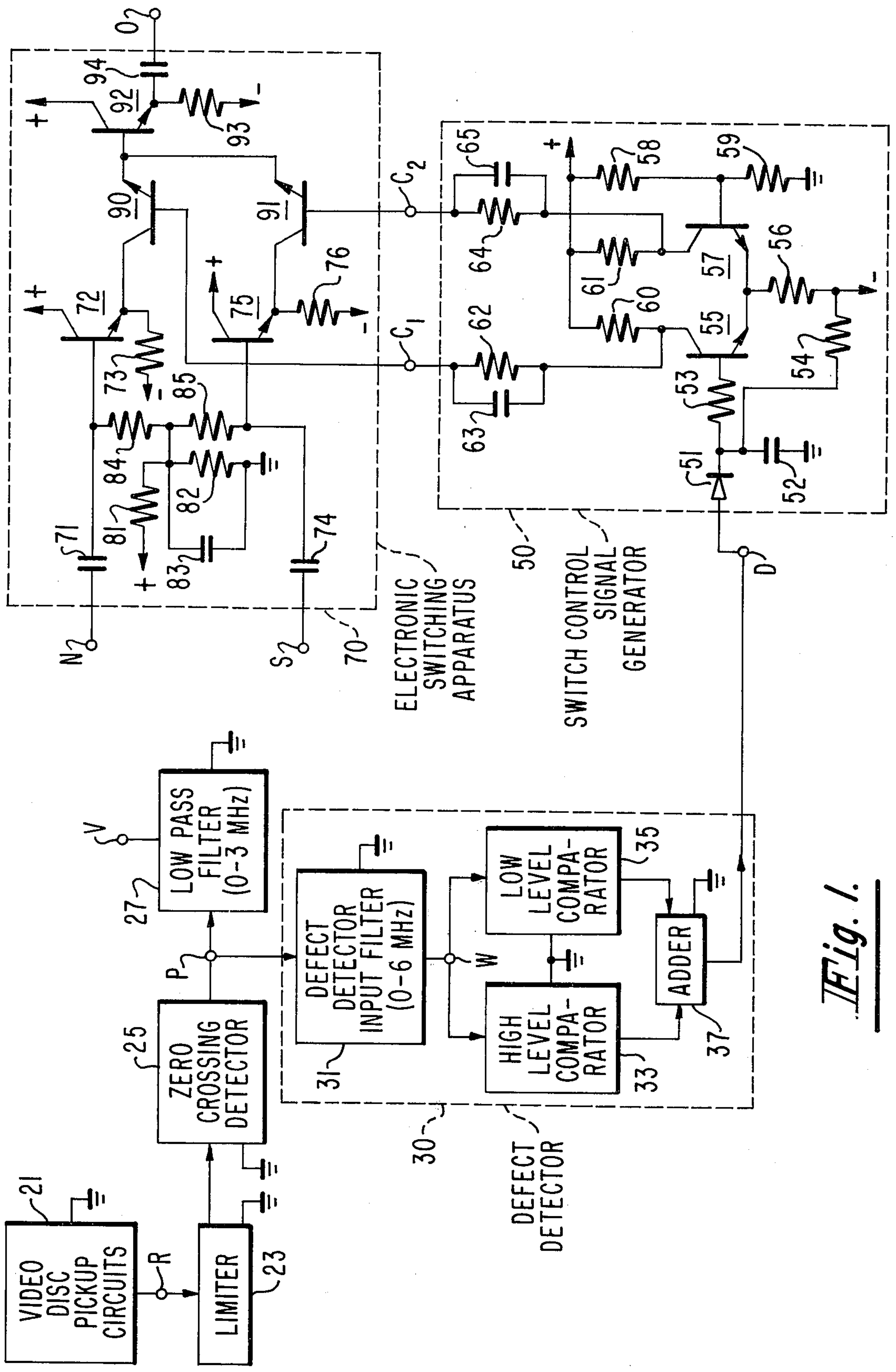

The present invention relates generally to signal switching apparatus, and particularly to novel circuit arrangements suitable for controlling and effecting the switching between normal and substitution signals in a picture defect compensation system.

In the copending application of Jon K. Clemens, Ser. No. 126,772 filed Mar. 22, 1971, now U.S. Pat. No. 3,842,194 a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded information comprises a carrier frequency modulated in accordance with video signals and appears in the form of successive groove bottom depth alternations between maximum and minimum depths. In use of such a FM carrier recording format, FM detector apparatus must be employed in the player to obtain video signals from the recovered FM signal.

Illustratively, the FM detector in the player may comprise a zero-crossing detector providing an output pulse of a standard width and amplitude in response to each zerocrossing of the input signal. The zero-crossing detector output is applied to a low-pass filter having a passband substantially matching the recorded video signal bandwidth to develop the desired video signals.

In operation of a video disc player of the abovedescribed type to recover recorded video signals for image display purposes, a problem observable in the displayed picture is the intermittent appearance in random locations of disturbances in the form of white and/or black spots and streaks supplanting the appropriate picture information. These picture defects may vary in length, thickness and persistence of appearance. While not destructive of the picture information as a whole, the intermittent appearance of such picture defects can be a source of considerable annoyance to the viewer. The present invention is concerned with compensation methods and apparatus for substantially eliminating or significantly reducing the annoying effects of such picture defects.

An analysis of the problem has revealed that a variety of different causes may lead to the production of different ones of the annoying picture spots and streaks. Some of the causes may be associated with defects in the record itself. Other causes may be associated with the conditions encountered in a particular playing of a given disc (e.g., stylus encounters with debris of various forms in various regions of the disc groove). Still other causes (e.g., scratches, dents, etc.) may be associated with the past history of use or abuse of the disc being played. Without further detailing of the causes of the picture defects, it is clear that there are myriad causes of differing types which result in the problem having a high degree of unpredictability, and varying from disc to disc, play to play, groove region to groove region, etc.

In the copending application of Jon K. Clemens, Jack S, Fuhrer and Michael D. Ross, entitled "Defect Detection and Compensation Methods and Apparatus" and filed concurrently herewith Ser. No. 477,102, filed 6-6-74) a system is disclosed for effectively masking the effects of signal defects during video disc playback. In the Clemens, et al. arrangement, defect detection involves reliance upon comparison of the instantaneous level of a video signal developed from an output of the player's FM detector will preselected maximum and minimum levels. The latter levels substantially correspond to the instantaneous video signal levels produced by that FM detector in response to input signal frequencies at the FM signal deviation range limits. Voltage level excursions outside the preselected level range provide defect indications which serve to control the switched substitution of information from a preceding image line for current information.

The defect detection approach of the Clemens et al. arrangement is based upon several well-grounded premises. First, it is recognized that the instantaneous carrier frequency of the FM signal input to the player's FM detector is shifted by desired signal information only within known fixed limits (i.e., the deviation range employed in recording), wherefore shifts to frequencies beyond such limits are due not to desired signal information but to spurious, defective signal development or delivery conditions. Second, it is observed that essentially all of the noticeable, troublesome picture defects (of the black and/or white streak or spot type discussed previously) stem from input signal defects (independent of their cause) that shift the apparent instantaneous carrier frequency well beyond the known deviation range limits.

Pursuant to an advantageous feature of the Clemens, et al. arrangement, which enhances the ability of the defect detector to clearly and quickly recognize the onset of a defect, the input to the voltage level comparators is not the video signal output of the FM detector used for image display purposes (which output is normally lowpass filtered and subject to video frequency de-emphasis in a manner strongly attenuating frequency components above the recorded video signal bandwidth). Rather the input to the level comparators is a video signal developed by a separate defect detector input filter in the form of a low pass filter having a cutoff frequency well above the highest recorded video signal frequency. Desirably, no video frequency deemphasis circuitry is associated with the defect detector input filter. Also, for accuracy of the level comparison, it is preferable that the input to the level comparators include the DC component of the recovered video signal.

The nature of most causes of the troublesome picture defects is generally such as to produce in the recovered FM signal a shift in the instantaneous frequency that is extremely abrupt relative to the carrier frequency shifts effected by the desired video signal modulation. The signal defect thus corresponds to a spurious modulation of the carrier by a signal having frequency components well above the highest frequency of the recorded video signal. By providing the defect detector input filter with a wideband response extending to a high frequency cutoff value (e.g., 6 MHz.) appreciably higher than the highest recorded video signal frequency (e.g., 3 MHz.), defect detection is enhanced in several important respects. The wideband response of the defect detector input filter enables its output to closely follow the abrupt onset of a signal defect. That is, upon the occurrence of a signal defect, the excursion of the filter output past a comparison threshold may be effected with a short rise time, enabling an early initiation of a defect indication pulse. With an appropriately rapid response provided for the associated compensation controlling device (e.g., electronic switching apparatus), the player can be shifted to a compensation mode of operation before the output of the slower-response narrowband filter developing the normal video signal output has been significantly disturbed by the signal defect.

Preservation of the high frequency components of the defect modulation in the output of the filter, moreover, enhances the magnitude of the defect onset voltage swing, aiding differentiation on an amplitude basis between defect and normal input levels to the comparators, and widening the range of acceptable settings for the comparison levels.

However, the wideband response of the defect detector input filter also enables its output to closely follow a return of the input signal frequency to a withinrange value, wherefore the termination of a defect indication pulse output of a comparator may precede the end of the related disturbance in the output of the slower-response filter that develops the normal video signal output. This could result in a premature return of the player to its normal operating mode, were the comparator output pulses, per se, to be used as the control signal for switching between normal and substitution signals.

Pursuant to a feature of the present invention, premature termination of defect compensation is avoided in a compensation system of the above-described type by novel switch control signal generating apparatus providing effective "stretching" of defect indication pulses. The switch control signal generating apparatus includes a simple envelope detector, employing a diode and a capacitor, to which defect indication pulses are applied. The diode is poled for conduction in response to defect indication pulse appearance to charge the capacitor. A resistive load for the detector provides a discharge path for the capacitor, establishing a discharge time constant which is long relative to the charging time constant associated with capacitor charging via the conducting diode. The detector output, exceeding a preselected comparison threshold during appearance of an input defect indication pulse, serves to bias a control transistor for conduction during such appearance. Upon termination of the defect indication pulse, the detector output does not drop instantly below the comparison threshold level, but rather descends thereto at a controlled rate determined by the capacitor discharge time constant.

By appropriate selection of the discharge time constant, defect indication pulse peak level, and comparison threshold level, the control transistor conduction is maintained followjng defect indication pulse termination until a capacitor discharge period of a desired time duration has concluded without appearance of a new defect indication pulse. An illustrative time duration choice for the "stretching" effect provided by the aforesaid capacitor discharge period is approximately 3 microseconds, an interval of sufficient length to essentially ensure recovery of the normal video signal output from the defect disturbance.

In an illustrative embodiment of the switch control signal generator, the aforementioned control transistor is associated in a differential amplifier configuration with a second control transistor biased to conduct in the absence of output from the defect indication pulse rectifier. The bias setting for the second control transistor establishes the comparison threshold level. Complementary switching waveforms incorporating the desired defect mode stretching are derived from the outputs of the respective control transistors.

In use of the switching waveforms, it is desired to provide activation of a substitution signal channel, and concomitant deactivation of a normal signal channel, during the defect mode of operation, and the converse during the normal mode of operation. Rapid switching, particularly into the defect mode, is requisite if the intended masking of picture defects is to be fully effective. Careful matching of various parameters of the respective channels is important if signal substitutions are to be relatively unnoticeable. A particularly troublesome aspect to the matching problem relates to the DC level in the respective channels. Where the switched signals are in video signal format, a DC level mismatch can result in brightness differences between normal and substitution signals that are undesirably noticeable. Moreover, even where the switched signals are in a modulated carrier format (as in an advantageous form of defect compensation system to be subsequently described), the result of a mismatch of the DC levels associated with the respective modulated carrier signals will be the introduction of a spurious high frequency transient at the level transitions that can appear as a defect in the picture.

Further features of the present invention are associated with the provision of electronic switching apparatus for achieving the desired rapid switching between normal and substitution signals wihtout introduction of deleterious DC level mismatch effects. In an illustrative embodiment of such switching apparatus, the respective normal and substitution signals are applied to respective emitter follower input stages, desirably having closely matched components and biased from a common voltage divider. The output of each input emitter follower is linked to the input of a common output stage, also in emitter follower configuration, by the collector-emitter path of a respective switching transistor. Each switching transistor is disposed with its collector electrode directly connected to the low impedance output circuit of an input emitter follower stage, and with its emitter electrode directly connected to the high impedance input circuit of the output emitter follower stage. The respective bases of the switching transistors respond to respective ones of the complementary switching waveforms developed by the switch control signal generator.

During the defect mode of operation, the switching transistor in the substitution signal path conducts in inverted mode saturation, while the switching transistor in the normal signal path is cut off. The converse conditions, with the normal signal switching transistor conducting in inverted mode saturation, is obtained during the normal mode of operation. Differences in the respective switching transistor parameters will introduce no significant DC level mismatch because of the extremely low values (e.g., one millivolt) of voltage drop obtained across the collector-emitter path of each switching transistor when operating in inverted mode saturation. A further aid to avoidance of DC level mismatch is afforded by using transistors of matching construction realized in a common monolithic integrated circuit for the respective input emitter follower stages, and by similarly using transistors of matching construction realized in a common monolithic integrated circuit for the respective switching transistors.

Figure 2:
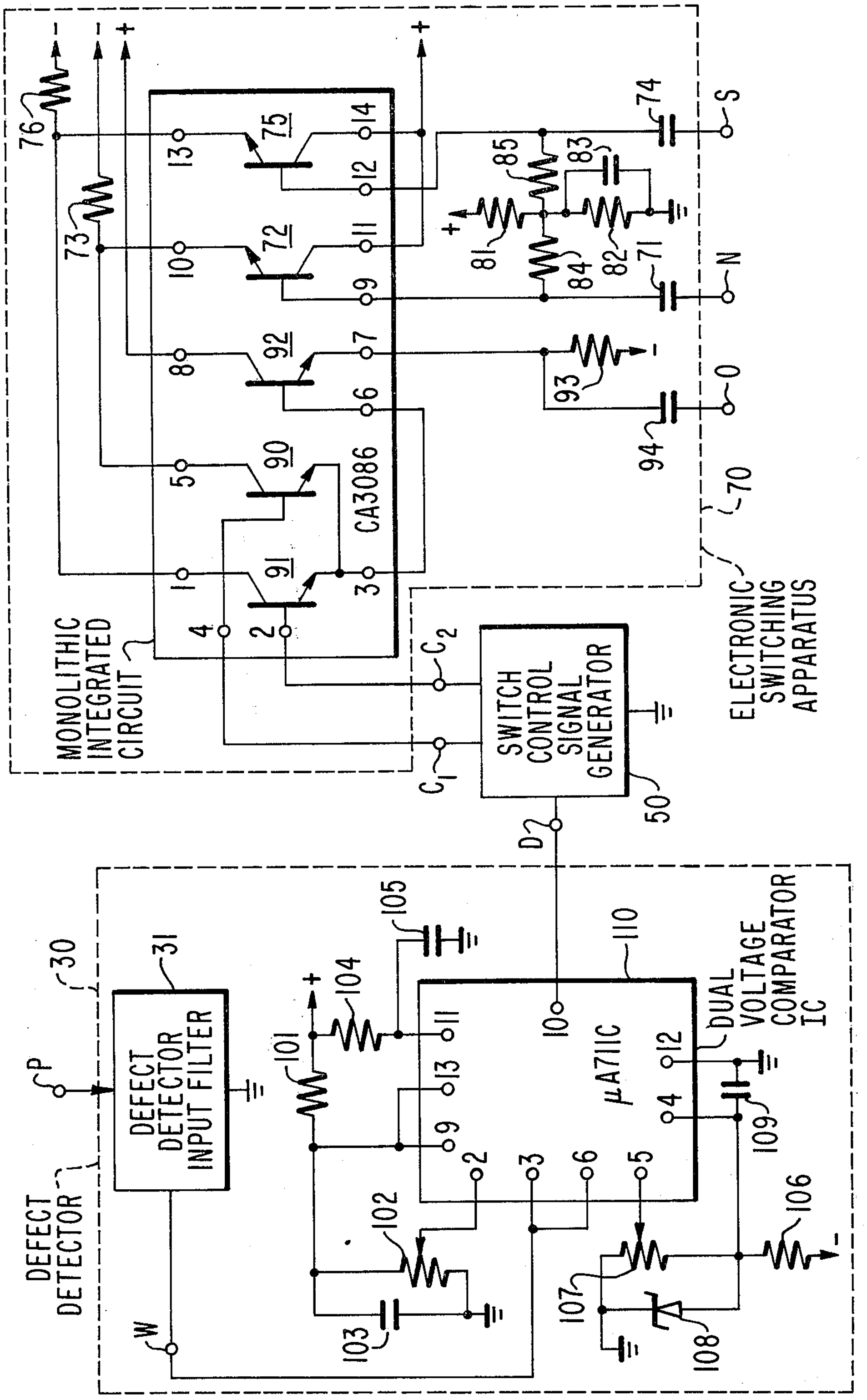

Objects and advantages of the present invention will be recognized by those skilled in the art upon a reading of the following detailed description and an inspection of the accompanying drawings in which:

FIG. 1 illustrates, partially schematically and partially in block diagram form, a picture defect compensation system employing apparatus in accordance with an embodiment of the present invention; and FIG. 2 illustrates further schematic details of circuit arrangements that may be employed in implementing the system of FIG. 1.

In the video disc player apparatus of FIG. 1, an input FM signal for the player's signal processing circuits is developed at terminal R by video disc pickup circuits 21. Illustratively, the video disc pickup system is of the capacitive type previously described, and the structure and circuit arrangement of the video disc pickup circuits 21 may be generally as described in the aforementioned Clemens application. It is assumed that the recording format for the disc to be played is such that the recovered signal information appears at terminal R as a frequency modulated carrier, the instantaneous carrier frequency deviating within fixed deviation range limits (e.g., 3.9 – 6.5 MHz.) in accordance with the amplitude of a video signal occupying a band of frequencies (e.g., 0–3.0 MHz.) below the deviation range, and representative of a succession of images to be displayed.

The input FM signal at terminal R is supplied via a limiter 23 (serving the conventional purpose of removing or reducing spurious amplitude modulation of the input FM signal) to a zero-crossing detector 25. The zero-crossing detector 25 may comprise circuits of well-known type for developing an output pulse of a fixed amplitude, width and polarity in response to each zero-crossing of the limited input FM signal. The pulse output of the zero-crossing detector 25 is supplied to an output filtering system, illustrated as comprising a lowpass filter 27. The passband of lowpass filter 27 substantially matches the band (e.g., 0–3 MHz.) occupied by the recorded video signal information.

The zero-crossing detector 25 and its output filtering system (27) form an FM detector of so-called pulse counter type, providing an output at terminal V in the form of a video signal corresponding to the modulation of the input FM signal. Under normal operating conditions for the player, the video signal output at terminal V serves, after suitable signal processing, to control the display of images by image reproducing apparatus such as a conventional television receiver (not shown, to simplify the drawing). A portion of the signal path traversed by the video signal information from terminal V, in the course of its "normal" delivery to the image reproducing apparatus, is a signal path between the "normal signal" input terminal N and the output terminal 0 of electronic switching apparatus 70. Disruption of this signal path, and activation of a substitution signal path (between a "substitution signal" input terminal S and the output terminal 0 of switching apparatus 70), is desired under defect conditions, and is achieved by the system now to be described.

Control of switching apparatus 70 to determine whether the player operates in the normal or substitution mode is achieved in FIG. 1 by a system including: (1) a defect detector 30, responsive to the output of zero-crossing detector 25 and serving to develop a pulse output indicative of defect occurrences in the input FM signal; and (2) a switch control signal generator 50, responsive to the defect indication pulse output of defect detector 30 and serving to develop complementary control signals for application to the control signal input terminals $C_1$ and $C_2$ of switching apparatus 70 to determine the switching state thereof.

The defect detector 30 includes a defect detector input filter 31 to which the pulse output of zero-crossing detector 25 is applied. Input filter 31 comprises a lowpass filter having a passband (e.g., 0–6 MHz.) appreciably wider than the passband of lowpass filter 27, thus being capable of passing signal components at frequencies significantly higher than the cutoff frequency of filter 27. The filter 31 desirably is capable of passing DC, and provides no deemphasis characteristic within its passband.

Also included in the defect detector 30 are a pair of voltage level comparators: high level comparator 33 and low level comparator 35. Each of the comparators is responsive to the wideband output of filter 31. High level comparator 33 serves to compare the instantaneous signal voltage level at the output of filter 31 with a preset comparison maximum voltage, and to develop an output pulse of a given polarity whenever the instantaneous level of the output of filter 31 exceeds the comparison maximum (the output pulse duration corresponding to the length of time during which the filter output level remains above the preset maximum level). The low level comparator 35 serves to compare the instantaneous output voltage level of the output of filter 31 with a preset comparison minimum voltage, and to develop an output pulse of said given polarity whenever the instantaneous level of the filter output falls below the comparison minimum (the output pulse duration corresponding to the length of time during which the filter output level remains below the preset minimum level). Also included in the defect detector 30 is an adder 37 which combines the pulse outputs of the comparators 33, 35 to develop a composite defect indication pulse output at output terminal D.

The input to switch control signal generator 50 comprises the defect indication pulses appearing at terminal D, which are applied to an envelope detector formed by a diode 51 and a capacitor 52 connected serially between terminal D and a point of reference potential (e.g., ground). Diode 51 is poled for forward conduction in response to the appearance of a defect indication pulse (illustratively of positive polarity) at terminal D, the diode conduction resulting in the charging of capacitor to a positive potential substantially corresponding to the peak level of the defect indication pulse, which potential is held throughout the duration of the pulse. A resistive path, formed primary by the shunt receiver 54 which is connected between the diode-capacitor junction and a source of negative supply potential, provides a path for discharge of capacitor 52 following the termination of a defect indication pulse. The discharge time constant is large relative to the charging time constant associated with the diode 51 when conducting.

A pair of control transistors 55 and 57 are arranged in a differential amplifier configuration, sharing an emitter resistor 56 and provided with respective collector resistors 60 and 61 which are returned to a source of positive supply potential. A substantially fixed positive bias for the base of the control transistor 57 is provided by a bias voltage divider formed by the series combination of resistors 58 and 59 shunting a potential supply, with the base of control transistor 57 directly connected to the junction of resistors 58, 59. The base of control transistor 55 is connected via resistor 53 to the junction of the previously mentioned elements 51, 52.

In the absence of a defect indication pulse input, the control transistor 57 is biased in the conducting state, and the control transistor 55 is held in a cutoff state. Under these conditions, the collector of the cutoff control transistor 55 (and the switch control terminal $C_1$, connected thereto via a coupling resistor 62) is at an elevated positive potential, while the collector of the conducting transistor 57 (and the switch control terminal $C_2$, connected thereto via a coupling resistor 64) is at a depressed positive potential. As the leading edge of a defect indication pulse appears, rapid charging of capacitor 52 quickly raises the potential at the base of control transistor 55 sufficiently above the joint emitter potential to drive control transistor 55 into conduction, with the resultant elevation of the joint emitter potential driving control transistor 57 into a cutoff state.

The previously mentioned collector (and switch control terminal) potential conditions as thereupon reversed, with the collector potential of control transistor 55 depressed and the collector potential of control transistor 57 elevated. A rapid transition between the respective conditions is aided by the inclusion of respective speed-up capacitors 63, 65 in shunt with the respective coupling resistors 62, 64.

The switching waveform at switch control terminal $C_1$ is directly applied to the base of a switching transistor 90, while the switching waveform at switch control terminal $C_2$ is directly applied to the base of a switching transistor 91. The collector-emitter paths of the respective switching transistors 90, 91 are serial elements of the normal signal path and the substitution signal path, respectively, in the electronic switching apparatus 70.

The normal signal path includes an input emitter follower stage employing a transistor 72, with its base coupled via a blocking capacitor 71 to the input terminal N. The collector of transistor 72 is directly connected to a positive supply potential source, while the emitter is connected to a negative supply potential source via an emitter resistor 73. The collector of switching transistor 90 is directly connected to the emitter of input transistor 72.

The substitution signal path includes an input emitter follower stage employing a transistor 75, with its base coupled via a blocking capacitor 74 to the substitution signal input terminal S. The collector of transistor 75 is directly connected to a positive bias potential source, while the emitter is connected to a negative bias potential source via an emitter resistor 76. The collector of switching transistor 91 is directly connected to the emitter of input transistor 75.

A common base bias source for the input transistors 72, 75 is provided by a voltage divider formed by the series combination of resistors 81 and 82 shunted across a positive potential source. A filter capacitor 83 shunts the divider resistor 82. A pair of resistors 84 and 85, desirably matched in value, are coupled between the junction of resistors 81, 82 and the bases of the respective input transistors 72 and 75.

A common output stage for the respective signal paths is provided by an output emitter follower employing transistor 92, with its base directly connected to the emitters of both of the switching transistors 90, 91. The collector of transistor 92 is directly connected to a positive bias potential source, while the emitter is connected to a negative bias potential source via an emitter resistor 93. A coupling capacitor 94 links the emitter of the output transistor 92 to the switching apparatus output terminal 0.

In operation of the system of FIG. 1, the above-described circuit arrangement for the switch control signal generator 50 enables derivation in a simple manner of complementary switching waveforms, incorporating a desired defect mode stretching, from the collectors of the control transistor pair 55, 57. Control of the degree of stretching, to ensure full masking of picture defects, is readily achieved by appropriately interrelated choices of the discharge time constant (primarily determined by the values of capacitor 51 and resistor 54), the defect indication pulse peak level (provided by the combined outputs of comparators 33, 35), and the comparison threshold level (primarily determined by the base bias established by the voltage divider 58, 59).

The above described circuit arrangement for the electronic switching apparatus 70, moreover, provides a reliable system for rapid switching between normal and substitution modes of operation without troublesome DC level mismatch effects. The mismatch problem is lessened by inverted mode saturation operation of each switching transistor (90, 91) during their respective periods of conduction. Matching of comparable elements in the respective signal paths also lessens the mismatch problem. To this end, it is desirable that the respective input transistors 72, 75 comprise transistors of matching construction realized in a common monolithic integrated circuit; similarly desirable is use for the respective switching transistors 90, 91 of transistors of matching construction realized in a common monolithic integrated circuit.

FIG. 2 provides an illustrative example of the aforementioned use of I.C. techniques to obtain the desired close matching of input transistors and of switching transistors. In FIG. 2, a single monolithic integrated circuit chip 100, illustratively of the CA 3,086 type, provides all of the active devices 72, 75, 90, 91 and 92 for a switching apparatus circuit arrangement identical with that shown in FIG. 1.

FIG. 2 also provides an illustration of one particular circuit arrangement that may be employed in achieving the comparator and adder functions of the defect detector 30 in the FIG. 1 system. A dual voltage comparator integrated circuit chip 110, illustratively of the μA711C type, provides the active devices for the voltage comparison and adder functions. The output of detector filter 31, appearing at terminal W, is supplied jointly to an inverting input terminal 6 of one chip comparator and to a non-inverting input terminal 3 of the second chip comparator. The non-inverting input terminal 5 of the first chip comparator is coupled to an adjustable tap on the resistive element 107 of a negative supply voltage divider formed by the series combination of resistive elements 106, 107. Voltage stabilization is afforded by a zener diode 108 shunting the resistive element 107. The inverting input terminal 2 of the second chip comparator is coupled to an adjustable tap on the resistive element 102 of a positive supply voltage divider formed by the series combination of resistive elements 101, 102 (with the latter element shunted by a filter capacitor 103). A filtered positive supply potential is supplied to chip supply terminal 11 via a series resistor 104, with filtering provided by shunt capacitor 105. A filtered negative supply potential is supplied to chip supply terminal 4 via a series resistor 106, with filtering provided by a shunt capacitor 109, The respective tap adjustments on resistive elements 102 and 107 determine the respective comparison thresholds for the comparators 33, 35 (FIG. 1) and are set to approximate the levels to be expected when the input FM signal has an instantaneous frequency at the respective deviation range limits.

The manner in which the normal and substitution signal inputs are developed for application to terminals N and S of switching apparatus 70 is not of specific concern herein. However, reference may be made to the copending application of John G. Amery, filed concurrently herewith, for a description of a preferred development manner. In the Amery arrangement, both input signals appear in the form of a carrier amplitude modulated by video signals, with the "normal" signal modulation corresponding to current video signal output and the substitution signal modulation corresponding to video signals from a preceding image line.

What is claimed is:

1. In a system for playback of a record of successive images, said system including pickup means for recovering from said record carrier waves having an instantaneous frequency which is subject to variation over a given deviation range in accordance with the amplitude of an image-representative video signal of a given bandwidth, there being random occasions during the recovery of said video signal when the apparent instantaneous frequency of said carrier waves departs from said given deviation range; frequency modulation detecting means coupled to said pickup means, said detecting means including a low pass filter having a passband substantially limited to said given video signal bandwidth for providing a demodulated signal having an amplitude normally corresponding to the amplitude of said video signal but subject to spurious amplitude variations during said occasions of carrier wave frequency departure from said given deviation range; image display means; and means for normally supplying the demodulated signal output of said low pass filter to said image display means; an image defect compensation system comprising, in combination:

means coupled to said frequency modulation detecting means for developing a defect indication pulse of a given polarity in response to a departure of said instantaneous frequency from said given deviation range, the pulse duration substantially corresponding to the departure duration;

a capacitor;

a diode;

means for applying the output of said pulse developing means to a series combination of said diode and said capacitor, with said diode poled in said series combination for forward conduction in response to defect indication pulse development, so as to effect charging of said capacitor to a first potential above a given threshold potential;

resistive means coupled to said capacitor for discharging said capacitor to potential levels below said given threshold potential following cessation of said defect indication pulse development;

a normally cut off control transistor coupled to said capacitor and subject to conduction when said capacitor potential exceeds said given threshold potential; and means for disabling said demodulated signal supplying means in response to conduction by said control transistor.

2. Apparatus in accordance with claim 1 wherein said resistive means establish a discharging time constant for said capacitor which is long relative to a charging time constant for said capacitor provided by said applying means.

3. Apparatus in accordance with claim 2 also including:

a normally conducting control transistor coupled to said first-named control transistor, and subject to being cut off when said first-named control transistor conducts; and means coupled to said normally conducting control transistor for supplying a substitution signal to said image display means when said normally conducting control transistor is cut off.

4. Apparatus in accordance with claim 3 also including a first switching transistor having a collector-emitter path; wherein said substitution signal supplying means comprises a substitution signal path including said collector-emitter path as a serial element thereof; and wherein said first switching transistor is coupled to said normally conducting control transistor in such manner that said first switching transistor is normally cut off but conducts in an inverted saturation mode when said normally conducting control transistor is cut off.

5. Apparatus in accordance with claim 4 also including a second switching transistor having a collector-emitter path; wherein said demodulated signal output supplying means comprises a normal signal path including the collectoremitter path of said second switching transistor as a serial element thereof; and wherein said second switching transistor is coupled to said first-named control transistor in such manner that said second switching transistor is normally conducting in an inverted saturation mode but is subject to being cut off when said first-named control transistor is conducting.

6. In a video disc player including pickup circuits for developing during playback of a video disc record an FM signal having an instantaneous frequency subject to variation over a given deviation range in accordance with the amplitude of recorded video signals occupying a given frequency band, the combination comprising:

a zero-crossing detector coupled to said pickup circuits and responsive to said FM signal;

a first low pass filter having a passband substantially matching said given video signal frequency band, and coupled to receive the output of said zero-crossing detector;

a second low pass filter having a cutoff frequency substantially higher than the highest video signal frequency in said given frequency band, and coupled to receive the output of said zero-crossing detector;

means for utilizing the output of said first low pass filter to control the display of images;

means responsive to the output of said second low pass filter for developing an output pulse indicative of a departure of said instantaneous frequency from said given deviation range;

an envelope detector having a resistive load;

means for applying the output of said pulse developing means to said envelope detector;

a voltage comparator coupled to said envelope detector; and means responsive to the output of said voltage comparator for altering the mode of operation of said utilizing means.

* * * * *